(No Model.)
F. H. ROBERTS.
CONFECTIONERY HOLDER.
No. 580,625. Patented Apr. 13, 1897.
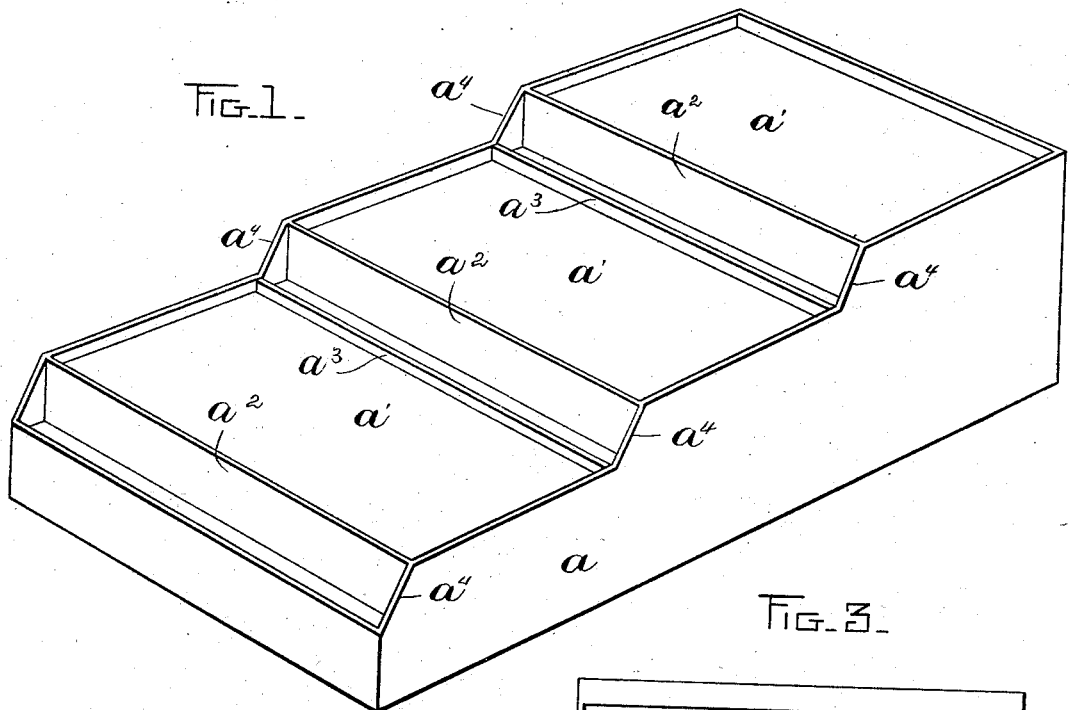
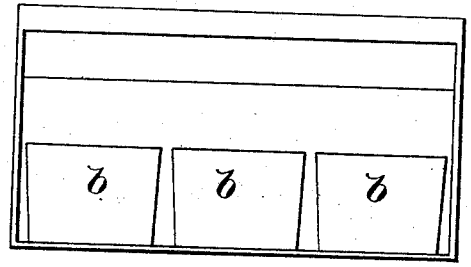
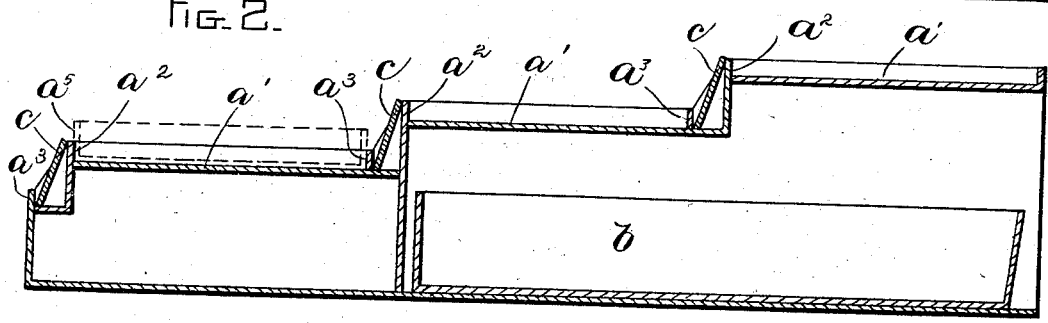
WITNESSES:
A. O. Harrison.
Rollin Abell
INVENTOR:
F. H. Roberts
by Wright Brown & Quinby
Attys.

ranked at different
UNITED STATES PATENT OFFICE.

FRED HENRY ROBERTS, OF SOMERVILLE, MASSACHUSETTS.

CONFECTIONERY-HOLDER.

SPECIFICATION forming part of Letters Patent No. 580,625, dated April 13, 1897.

Application filed April 24, 1896. Serial No. 588,901. (No model.)

*To all whom it may concern:*

Be it known that I, FRED HENRY ROBERTS, of Somerville, in the county of Middlesex and State of Massachusetts, have invented certain new and useful Improvements in Confectionery-Holders, of which the following is a specification.

This invention has for its object to provide a holder for confectionery, adapted to contain two or more boxes or trays which contain confectionery in bulk, and having its top formed to constitute a corresponding number of sample-trays, each adapted to hold a shallow layer of confectionery representing the contents of one of the trays contained in the holder.

The invention also has for its object to enable labels to be conveniently applied to and removed from the sample-trays, to designate the contents thereof.

The invention consists in the improved construction which I will now proceed to describe and claim.

Of the accompanying drawings, forming a part of this specification, Figure 1 represents a perspective view of a confectionery-holder embodying my invention. Fig. 2 represents a longitudinal section of the same. Fig. 3 represents a rear end elevation.

The same letters of reference indicate the same parts in all the figures.

In carrying out my invention I construct a box or casing $a$, which is open at one end and closed at other points and is of sufficient internal capacity to contain a plurality of trays or boxes $b$, each of which is or may be of sufficient capacity to hold several pounds of confectionery. The trays $b$ are inserted removably in the open end of the box and are of such form that candy can be dispensed or sold from them without removing them from the box. The box includes a suitable bottom, two side pieces, a front end piece, and a top. The top of the box or casing is composed of a series of flat sections $a'$, corresponding in number to the number of removable trays $b$ contained within the casing. Each section $a'$ constitutes the bottom of a shallow sample-holding tray, there being a raised rim around each section $a'$, as shown in Figs. 1 and 2.

The sections $a'$ are arranged at different heights, as shown in Figs. 1 and 2, and each is provided at its forward end or the end adjacent to the next lower section with a vertical wall $a^2$, which projects both above and below the section, forming a part of the raised wall above the section and extending below it to join the next lower section. Adjacent to each wall $a^2$ and separated from it by a narrow space is a narrower vertical wall $a^3$, the two walls forming the sides of a label-holder adapted to contain a label $c$, said holder having ends $a^4$ $a^4$, forming parts of the side pieces of the box. A label $c$ may therefore be placed at the front of each section $a'$ to designate the contents thereof.

It will be seen that by making the top of the box in a series of sections arranged at different heights and provided with retaining walls or margins and label-holders, as shown, I am enabled to expose and designate samples of the contents of the trays or boxes $b$, each sample being conspicuously placed at a different height from the others, so that each is attractively displayed and can be readily distinguished from the others.

If desired, the sections $a'$ may support supplemental trays $a^5$, as shown by dotted lines in Fig. 2, said trays being removable.

I claim—

1. A box or casing having a suitable bottom, two side pieces, a front end piece, an open back, a top composed of a series of horizontal sections, $a'$, arranged at different heights, and a series of label-holding compartments in front of and below the sections $a'$, each compartment having a high rear wall extending downwardly from the front edge of one of the sections $a'$, and a lower front wall.

2. A box or casing having a suitable bottom, two side pieces, a front end piece, a top comprising a series of horizontal fixed sections $a'$ arranged at different heights, a series of vertical walls $a^2$ located at the front edges of the sections $a'$ and extending downwardly below the sections, narrower walls $a^3$ adjacent to the walls $a^2$, and end portions $a^4$ $a^4$ formed on the side pieces of the box and coöperating with the walls $a^2$ and $a^3$ in forming label-holders at the front edges of and below the sections $a'$, the rear end of the box being open to give access to the internal space below said top, which space is adapted to contain supply-trays, while the sections $a'$ are adapted to hold samples of the goods contained in said trays.

In testimony whereof I have signed my name to this specification, in the presence of two subscribing witnesses, this 18th day of April, A. D. 1896.

FRED HENRY ROBERTS.

Witnesses:
  C. F. BROWN,
  A. D. HARRISON.